United States Patent [19]

Murray

[11] Patent Number: 4,678,981

[45] Date of Patent: Jul. 7, 1987

[54] PORTABLE POWER SOURCE FOR MOBILE STORAGE CARRIAGE

[75] Inventor: William P. Murray, Ft. Atkinson, Wis.

[73] Assignee: Spacesaver Corporation, Fort Atkinson, Wis.

[21] Appl. No.: 891,617

[22] Filed: Aug. 1, 1986

[51] Int. Cl.[4] ............... A43B 53/00; A43B 87/00
[52] U.S. Cl. ............... 320/2; 104/295; 180/19.1; 312/198; 312/201; 318/139
[58] Field of Search ............... 320/2–5, 320/25; 446/384, 443, 454, 455; 104/295, 302; 180/19.1, 65.1; 246/187 A, 187 B; 312/198, 200, 201; 318/139

[56] References Cited

U.S. PATENT DOCUMENTS

| 2,718,729 | 9/1955 | Giardina | 446/443 |
| 3,313,995 | 4/1967 | Bach et al. | 320/25 |
| 3,829,189 | 8/1974 | Staller | 104/295 X |
| 3,957,322 | 5/1976 | Mastronardi et al. | 312/198 |

*Primary Examiner*—R. J. Hickey
*Attorney, Agent, or Firm*—Fuller, Puerner & Hohenfeldt

[57] ABSTRACT

A portable electrical power source to provide electrical energy to movable carriages of mobile storage systems during an electrical power failure, a malfunction of motor control circuitry and/or safety related controls and movement of movable carriages during installation of mobile storage system before standard control system has been installed.

7 Claims, 4 Drawing Figures

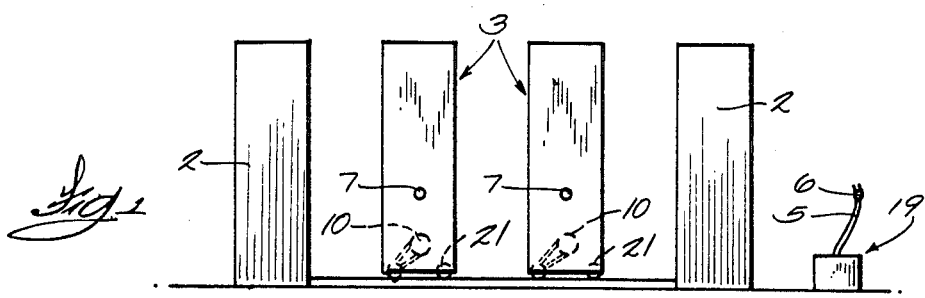
Fig. 1
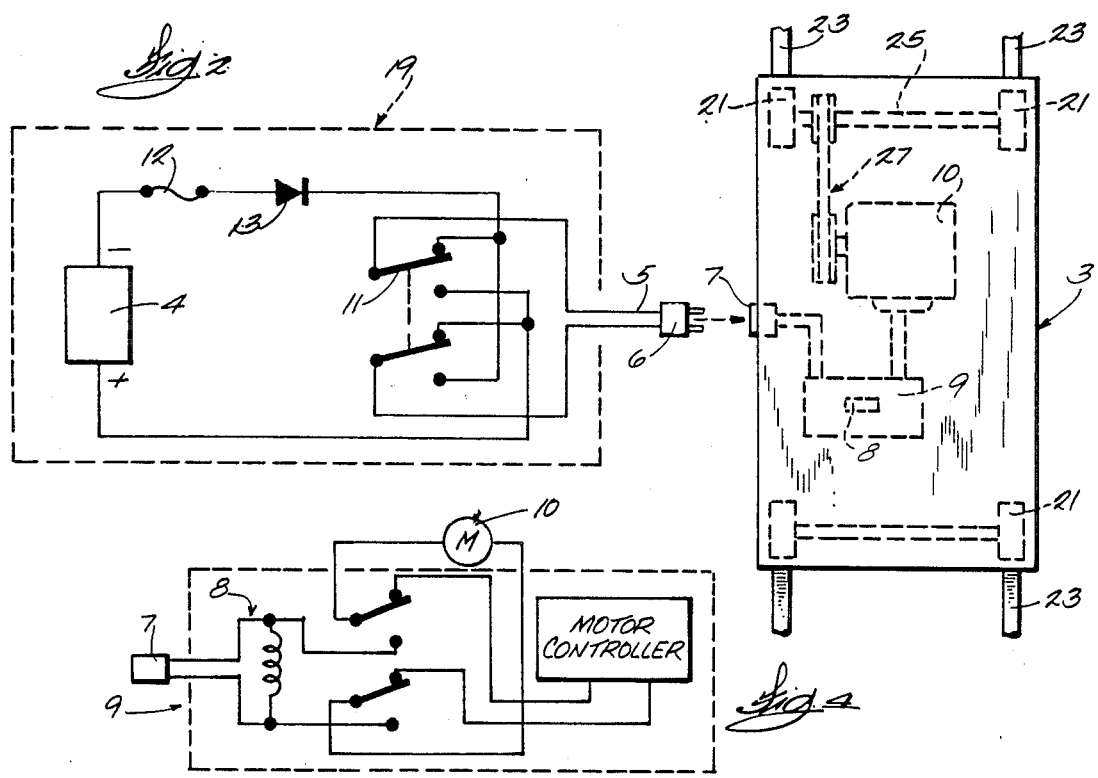
Fig. 2
Fig. 4
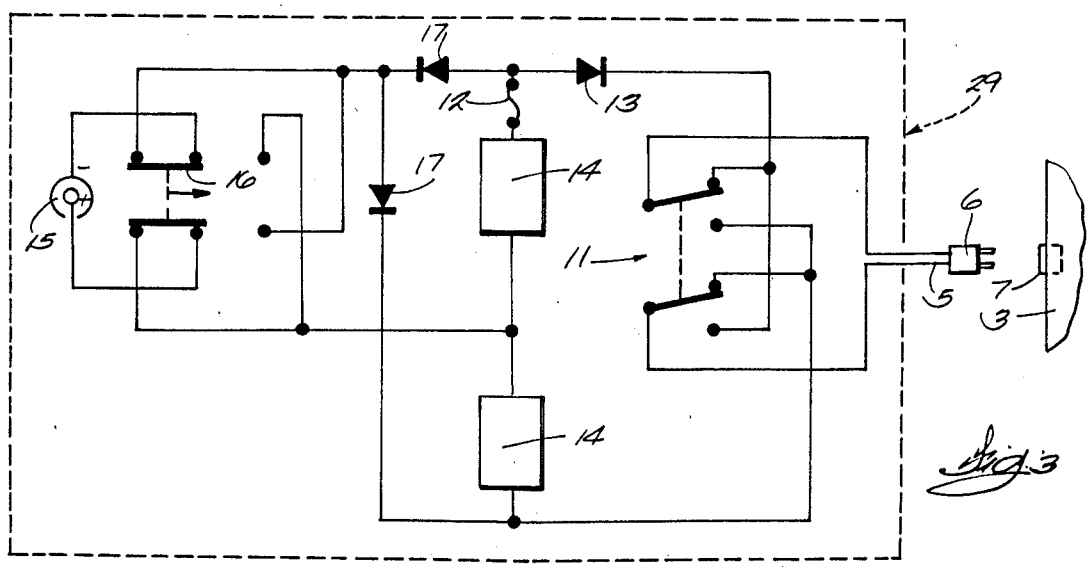
Fig. 3

PORTABLE POWER SOURCE FOR MOBILE STORAGE CARRIAGE

BACKGROUND OF THE INVENTION

1. Field of the Invention

This invention pertains to electrical power sources, and more particularly to electrical power sources for mobile storage carriages.

2. Description of the Prior Art

Mobile storage systems have gained widespread acceptance in libraries and offices because of their ability to save valuable floor space. Electrically powered mobile storage systems are becoming increasingly popular to move heavily loaded carriages without expending muscular effort.

A potential disadvantage of electrically powered carriages is the possibility of line power failure. In addition, a component of the mobile storage system electrical control or safety stop systems conceivably may fail. In either event, a carriage cannot be moved under power until the failure is corrected.

Although mechanical overrides are available, they are not suitable for use with all movable carriages. For example, mechanical overrides cannot be used on carriages that are not equipped with line shaft drives. Even if the carriage is equipped with a suitable mechanical override, manual force is required to move the carriage.

Another possible shortcoming of electrically powered mobile storage systems is the inability to move the carriages during assembly of the shelves before the control system has been installed. Manual movement of partially assembled carriages is inconvenient and reduces manufacturing productivity.

Thus, a need exists for a universal source of power for moving electrically powered mobile storage carriages under abnormal operating conditions.

SUMMARY OF THE INVENTION

In accordance with the present invention, reliable and inexpensive equipment is provided to produce portable electrical power to an electrically powered mobile storage carriage of a mobile storage system in response to an electrical power failure, a malfunction of motor control circuitry and/or safety related controls and assistance in movement of said mobile storage carriage of said mobile storage system during installation of said mobile storage system before the standard control system has been installed. This is accomplished by an apparatus that includes appropriate batteries (disposable or rechargeable), selector switch and appropriate connectors.

Electric power is supplied by the invention to the traction motor of a movable carriage of said mobile storage system by means of a cable and electrical connector which in turn disconnects the main electrical circuitry of the movable carriage of said mobile storage system from the traction motor. A three position switch on the invention directs and changes the polarity of the electrical current from the invention to the traction motor of the movable carriage of said mobile storage system. The changing of polarity of the electrical current results in a changing in direction of travel of the traction motor of the movable carriage of said mobile storage system.

The invention can be equipped with either disposable or rechargeable batteries. The addition of a selector switch and appropriate electrical jack will allow the electrical recharging of appropriate rechargeable batteries.

Other objects and advantages of the invention will become apparent to those skilled in the art upon reading the disclosure.

BRIEF DESCRIPTION OF THE DRAWINGS

FIG. 1 is a side view of a typical mobile storage system.

FIG. 2 shows the invention with disposable batteries as it would connect to a movable carriage of said mobile storage system.

FIG. 3 shows the invention with rechargeable batteries.

FIG. 4 is an enlarged view of circuit components in FIG. 3.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a mobile storage system 1 is illustrated that consists of one or more stationary shelf units 2 and one or more movable carriages 3. The movable carriages 3 are equipped with wheels 21 for rolling along parallel rails 23, as is known in the art. As best shown in FIG. 2, a pair of wheels 21 is connected by a shaft 25 that is driven through a suitable drive train 27 by a traction motor 10. The invention is especially useful for moving the movable carriages 3 during an electrical power failure, a malfunction of motor control circuitry and/or safety related controls and for assistance in movement of the movable carriages 3 before the standard control systems of the mobile storage system 1 has been installed.

Referring to FIG. 2, the present invention is composed of a battery 4 of appropriate size that provides electrical current through a cable 5 and appropriate connector 6 to an appropriate receptacle 7 mounted on the movable carriage 3. The connection of the connector 6 to the receptacle 7 will cause the switch 8 which may form a portion of the receptacle to open circuit disconnecting the main electrical control circuitry 9 of the movable carriage 3 from the traction motor 10 of the movable carriage 3. The invention further comprises a switch 11 that directs and determines the polarity of the electrical current sent to the traction motor 10. The changing of polarity of the electrical current sent to the traction motor 10 results in a change in direction of rotation of the traction motor 10 further resulting in a change in direction of travel of the movable carriage 3. The invention further includes a fuse 12 of appropriate size and rating to protect the invention from possible short circuit conditions and diode 13 to protect the invention from possible damage from the main control circuitry 9 of the movable carriage 3. The batteries, switch 11, fuse 12, and diode 13 are enclosed in a convenient and portable hand held casing 19, which may include a carrying handle.

Referring to FIG. 3, the invention may further be comprised of rechargeable batteries 14 of appropriate size to replace the disposable batteries 4 shown in FIG. 2. In addition to the other items previously listed, the invention would further include an electrical jack 15 to receive the electrical current from the battery recharger circuitry, not shown, necessary to recharge the batteries 14. The invention would also have a switch 16 that would direct the electrical current from the jack 15 to the battery 14 to be recharged. The invention would also contain diodes 17 of appropriate size and rating to properly direct the electrical current to the battery 14 to be recharged. A convenient portable casing 29 encloses the components of the embodiment of the present invention shown in FIG. 3.

Thus, it is apparent that there has been provided, in accordance with the invention a portable power source that fully satisfies the objects and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall with the spirit and broad scope of the appended claims.

We claim:

1. In combination with a mobile storage system having at least one carriage mounted for movement along rails; motor means for powering the carriage along the rails; and circuit means for controlling the motor means, apparatus for providing electrical power to the carriage comprising:
   a. a portable source of electrical power comprising:
      i. at least one electric battery;
      ii. switch means in series with the battery for controlling the polarity of the electric current from the battery;
      iii. a hand held casing enclosing the battery and switch means; and
      iv. connector means extending from the casing for distributing the electric power from the switch means;
   b. an electrical receptacle mounted to the carriage, the receptacle being adapted to receive the connector means of the portable power source, the receptacle being electrically connected to the circuit means for controlling the motor means and connected to the motor means; and
   c. an electrical switch in series with the circuit means for controlling the motor means and a associated with the receptacle, the switch being operable to open when the connector means is inserted into the receptacle to thereby open the circuit means for controlling the motor means,
   so that the portable source of power provides electric power to the motor means for moving the carriage in selected directions along the rails.

2. The combination of claim 1 wherein the portable source of electric power further comprises safety means for protecting the battery from circuit malfunctions.

3. The combination of claim 2 wherein the safety means comprises:
   a. a fuse in series with the battery and switch means to protect against a short circuit in the circuit; and
   b. a diode in series with the battery and fuse to protect against damage from the carriage circuit means for controlling the motor means.

4. Apparatus for providing electric power to move a movable carriage of a mobile storage system, the carriage being equipped with an electric motor and a circuit for controlling the motor, comprising:
   a. an electrical receptacle mounted to the carriage and electrically connected to the carriage motor;
   b. a safety switch associated with the receptacle and located in the circuit for controlling the motor, the switch being operable between a closed condition and an open condition to thereby respectively close and open the circuit for controlling the motor;
   c. a portable casing;
   d. battery means within the casing for producing electric power;
   e. switch means electrically connected to the battery means for controlling the polarity of the electric motor; and
   f. connector means for distributing the electric power from the switch means to the carriage motor, the connector means being selectively insertable into the electrical receptacle to operate the safety switch to be open condition to thereby open the circuit for controlling the motor and removable from the receptacle to close the circuit for controlling the electric motor, so that the carriage may be safely moved in both directions from power supplied by the battery means.

5. The apparatus of claim 4 further comprising:
   a. a fuse in series with the battery means and switch means for protecting the battery means from short circuit conditions; and
   b. a diode in series with the battery means and fuse to protect the battery means from damage from the carriage circuit for controlling the motor.

6. The combination of claim 1 wherein:
   a. the electric battery is rechargeable; and
   b. the portable source of electric power further comprises means for recharging the batteries.

7. The apparatus of claim 4 wherein:
   a. the battery means within the casing is rechargeable; and
   b. the portable casing means includes means for recharging the battery means.

* * * * *